April 17, 1956  N. G. BENNETT  2,742,542
INERTIA OPERATED DEVICES

Filed March 17, 1953  3 Sheets-Sheet 1

Inventor
NEILL GIBSON BENNETT
By
Attorney

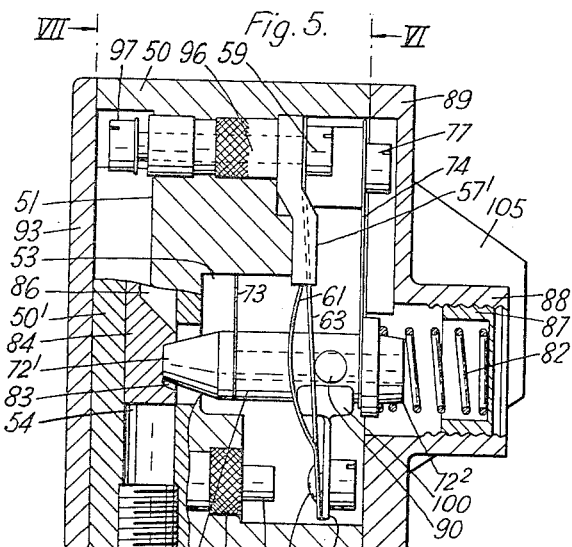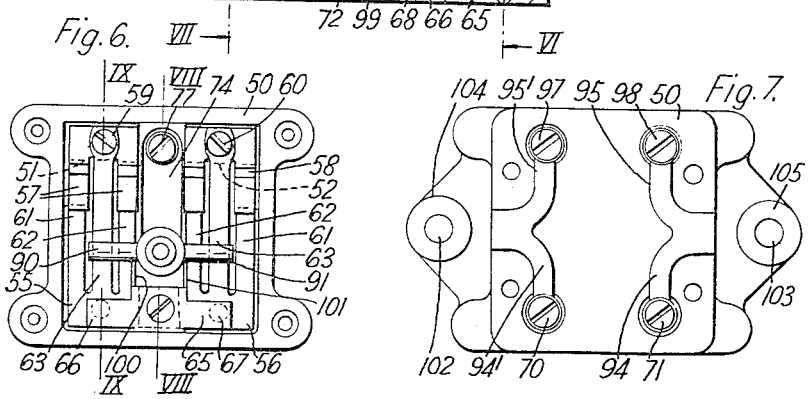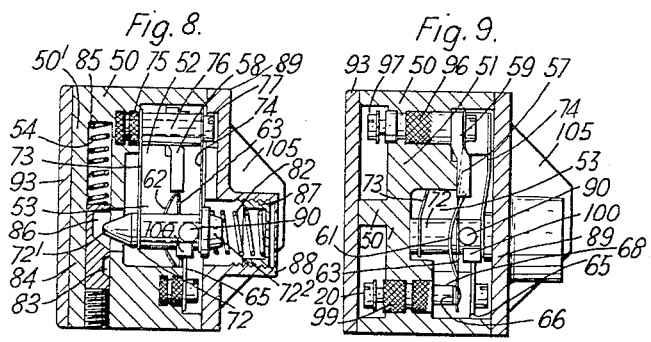

United States Patent Office 2,742,542
Patented Apr. 17, 1956

2,742,542

INERTIA OPERATED DEVICES

Neill Gibson Bennett, Staines, England, assignor of one-half to Graviner Manufacturing Company Limited, and one-half to The Wilkinson Sword Company Limited, both of London, England, each a British company Application March 17, 1953, Serial No. 342,835

Claims priority, application Great Britain March 27, 1952

11 Claims. (Cl. 200—61.53)

This invention relates to inertia operated devices and in particular to inertia operated switches.

Inertia operated switches which operate automatically on deceleration attaining a given magnitude are known in connection with aircraft, the switch being operated on deceleration of the aircraft resulting, for example from impact, to close an electric circuit to initiate, for example, the operation of fire extinguishers.

The object of the invention is to provide an inertia operated switch which will only operate to initiate a desired operation after it has been subjected to an acceleration exceeding a critical value determined by the design and/or setting of the switch.

With the foregoing object in view in an inertia operated device made according to the invention adapted for fitment to projectiles or missiles having a high initial acceleration, the inertia element is unlatched upon firing of the projectile or missile and is arranged to effect a desired operation when the acceleration falls below a predetermined value.

The inertia element is free to move in one direction under the action of an acceleration exceeding a predetermined value and is normally subject to a force tending to move it in the opposite direction into a position in which it is to become operative, the element being held in an inoperative position against the action of this force until it is first moved away from the operative position by an acceleration exceeding the predetermined value.

The force normally acting on the inertia element may be obtained from spring means, and may be the resultant of two opposing spring pressures.

Means may be provided for varying the spring force, or the resultant spring force, acting on the inertia element, for example by varying the loading of the spring means producing the force.

The means for holding the inertia element in the inoperative position may comprise a spring-pressed latching member arranged to be automatically released when the inertia element moves as a result of acceleration. This latching member may be pivotally mounted intermediate its ends, one end normally engaging the inertia element, and being held in this latching position by a slidably mounted locking member which, when acceleration actuates the inertia element, moves out of the locking position and prevents the return of the latch. The locking member may be spring-pressed and the springs producing the spring force acting on the inertia element and on the locking member may be coil springs, the axial length of which can be varied to vary the pressures exerted respectively by these springs.

One construction of inertia operated switch according to the invention comprises a first spring acting on the inertia element to oppose movement thereof into an operative position, a second spring exerting a bigger force on said inertia element in opposition to the first spring and tending to move it into the operative position, a latching member holding the inertia element in inoperative position against the unbalanced pressure of the second spring, said latching member being automatically released by movement of the inertia element when a predetermined acceleration takes place, whereupon the inertia element moves into the operative position when the acceleration again decreases to an extent such that the force produced thereby is less than the unbalanced force produced by the opposing spring.

In another embodiment of the invention the force tending to move the inertia element into the operative position becomes effective when the acceleration effecting the release of the latch subsequently falls to a predetermined critical value and acts to move the inertia element into the operative position against a smaller spring pressure which opposes this movement, this smaller opposing spring pressure being produced by one or more three-pronged leaf springs each carrying a movable contact cooperating with an associated fixed contact to close one or more external control circuits.

In the accompanying drawings which illustrate how the invention may be carried into effect:

Figure 5 is a sectional side view of a modified form of device made in accordance with the invention;

Figures 6 and 7 are end views taken on section lines VI—VI, VII—VII, of Fig. 5 respectively, and Figures 8 and 9 are sectional views taken respectively on lines VIII—VIII and IX—IX, Fig. 6 showing the parts in two different positions in the course of operation.

Figure 1:
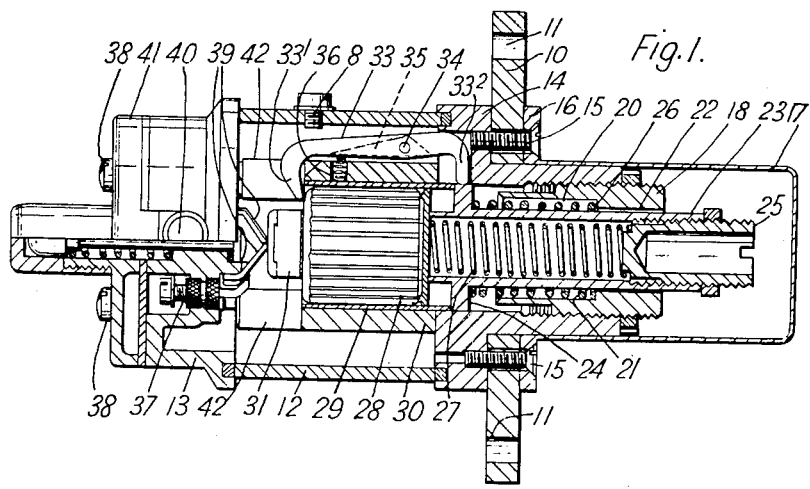
Figure 1 is a side view and Figure 2 a plan view, both views being partly in section, of one embodiment of an inertia operated device made in accordance with the invention.
Figure 2:
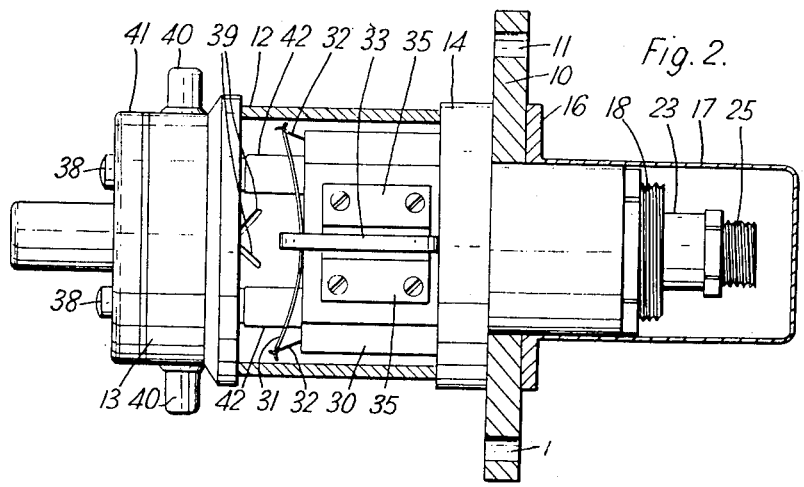

Referring first to Figs. 1 and 2, the device shown in these figures comprises a mounting or base plate 10 having apertures 11 to receive bolts or the like for fixing it in position, for example, on a part of an aircraft structure. The casing enclosing the mechanism comprises a cylindrical transparent body 12 having fitted thereto at one end an insulation material terminal box 13 and at the other end a flanged fitting 14 screwed by screws 15 to the base plate 10 and to a flange 16 on an extended casing part 17, the latter being closed at its outer end.

The inner wall surface of the fitting 14 is screw-threaded to receive a member 18 having a bore comprising two diameters, the larger diameter bore 20 accommodating a spring 21 and the smaller diameter bore 22 serving to guide a tubular member 23. The latter is formed with a flange 24 adjacent one end, and the inner wall at the other end is screw-threaded to receive a screw plug 25. The spring 21 bears at one end against a shoulder 26 and at the other end against the flange 24. A spring 27 disposed in the tubular member 23 bears at one end against the screw plug 25 and at the other end against an inertia element or trip weight 28 which is slidably mounted in a sleeve 29 mounted in a fitting 30 firmly secured to or integral with fitting 14 by screws 38, 38 extending therefrom to the terminal box 13.

The member 28 is normally retained in the sleeve 29 in the position shown in Fig. 1 by spring means comprising a bow or diaphragm spring 31, the ends of which are engaged by resilient means 32, 32 providing facilities for regulating the setting at which the member 28 will move when acceleration is falling. Such spring retaining means are fully described in British patent specification No. 635,672. In addition to these spring retaining means, in the device shown in the drawings the inertia member is latched in the position shown in Fig. 1 by a latching member 33 pivotally mounted intermediate its ends on pivot pin 34 fixed on lugs 35. Both ends $33^1$, $33^2$ of the member 33 are turned inwards, the end $33^1$ normally engaging the weight 28 and being retained in this position because the end 33² bears on the flange 24 which prevents rocking of the member 33 around the pivot pin 34. A spring 36 located in an aperture in the fitting 30 is arranged to bear outwardly on the latch 33 tending to rock it around its pivotal mounting against an adjustable stop 8 screwed into the wall of the body 12, but restrained from so doing by reason of the flange 24.

The terminal box 13 is provided with two terminal screws 37 and with two resilient spring contacts 39, only one screw 37 being shown in the drawings. Electrical connections are made to the screws 37 by cable leads entering the terminal box 13 through synthetic rubber or light sealing devices 40, 40, clamped by means of terminal box cover 41 held by the screws 38 which engage studs 42, 42 on the fitting 30 and secure terminal box 13 thereto.

The above described device is desgined to operate as follows:

The pressure of the spring 21 on the flange 28 can be varied by axially adjusting the member 18 in the fitting 14 and the pressure of the spring 27 against the inertia element or trip member 28 can be adjusted by correspondingly adjusting the screwed plug 25, these two adjustments providing for predetermining and presetting the acceleration value at which the device unlatches. It will be assumed for the purpose of the present explanation that the spring 27 exerts a forward pressure equivalent to 4g on the member 28, whilst the bow spring 31 is assumed to exert on the opposite end of the member 28 a pressure equivalent to 3g. Forward movement of the member 28 is normally prevented by the latch 33 which, as shown in Fig. 1, engages in front of the member 28 and prevents forward movement thereof the latch being held in this locking position by the flange 24 which is, in turn, held in the locking position by the spring 21.

Figure 3:
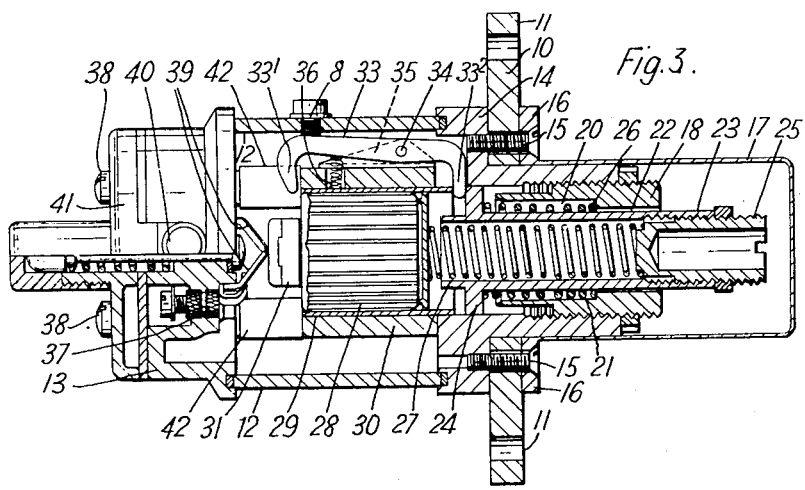
Figures 3 and 4 are views similar to Figure 1 but showing the parts in two different positions in the course of operation.
Figure 4:
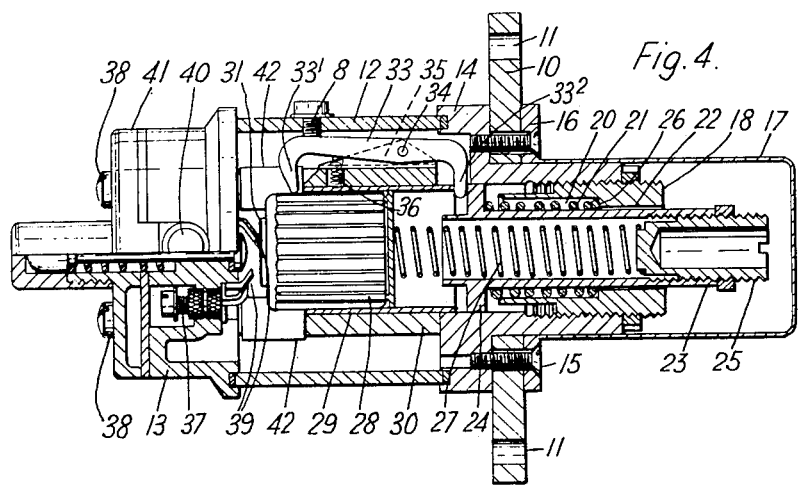

The parts are retained in the positions shown in Fig. 1 until an acceleration of 10g or more is applied to the device in a forward direction, whereupon the member 28 presses flange 24 back against the spring 21, so that latch member 33 rocks under the action of spring 36, the end 33¹ rocking outwards away from member 28 so as to release the member 28, and the end 33² dropping in front of the flange 24 so as to hold it in the retracted position against the action of the spring 21 as shown in Fig. 3. As the acceleration falls the member 28 moves forward under the action of spring 27 until finally, when the acceleration falls below 1g spring 27 is able to overcome the opposing pressure of the spring 31, which is thus tripped or flicked over into contact with the contacts 39 closing an external circuit which effects a desired operation.

The embodiment of the device shown in Figs. 5–9 comprises a housing 50 made of insulating material and having moulded integrally therewith two blocks 51, 52 on which the parts of the device are to be mounted, a space 53 being left between the two blocks. The wall 50' of the housing 50 is made thick to enable a circular bore 54 to be formed therein immediately in front of the space 53.

The electrical switch mechanism of the device comprises a known form of snap action type of switch mechanism comprising two trident spring blade systems 55, 56 Figure 6 which are mounted respectively upon plates 57, 58 screwed respectively on to blocks 51, 52 by means of screws 59 and 60. Each trident spring blade system comprises two side elements 61, 62 and a central element 63 these parts being integral at one end which bears against a plate 65 extending across the housing and screwed thereto.

The arrangements are such that when in the normal position shown in Figure 5 the spring system rests against plate 65 the free end of each spring system 55, 56 carries an electrical contact 66 or 67, each of which co-operates with a fixed contact only one of which is shown at 68 (Figures 5 and 9) and which are mounted in the housing and connected by a terminal 70 or 71 (Fig. 7) to an external circuit.

An inertia element 72 is suspended on two flexible leaf spring 73, 74 the ends of which are secured (see Fig. 8) in a post comprising a moulded insert 75, a cylindrical part 76, and a screw 77 passing through the cylinder 76 and engaging a tapped aperture in the insert 75, the flexible leaf springs 73, 74 being clamped between the insert 75 and one end of the cylinder 76 and between the other end of the cylinder 76 and the head of the screw 77.

The inertia element 72 is mounted in the central space 53 and is made in three parts, namely, a conical end 72¹ having a screw-threaded spigot extension 73, a cylindrical part 72, and a flanged end part 72² which is tapped to receive the spigot 73. The conical end 72¹ is normally pressed by a spring 82 into engagement with a recess 83 in a latching member 84 slidably mounted in the channel 54 this latching member 84 being pressed by a spring 85. The latching member 84 has a second deeper recess 86 to allow the inertia element 72 to move forward during operation as hereafter described. The spring 82 bears at one end against the flange on the part 72² and at the other end against the wall of a cap 87 screwed into a tapped boss 88 in a base plate 89 screwed on to the housing. The pressure of the spring 82 can be adjusted to vary the critical acceleration value at which the switch is to operate by axial adjustment of the cap 87. Two pins 90, 91 made of insulating material are fixed to opposite sides of the element 72 and extend over the centre elements 63, 63 of the trident springs 55, 56 for the purpose hereafter described.

The wall or base 50¹ is moulded integral with the housing and has a cover plate 93 secured thereto by four screws not shown. The wall 50¹ has moulded therein two wiring channels 94, 94¹ for the supply circuits and two wiring channels 95, 95¹ for two corresponding outgoing or control circuits, each of the spring systems 55, 56 thus controlling a separate circuit.

The screws 59, 60 respectively project (see Figs. 5 and 9) into inserts 96 only one of which is shown in the drawings. These inserts 96 are moulded in the blocks 51, 52 and project into wiring channels 95, 95¹, the projecting ends being tapped to receive terminal screws 97, 98 for the wiring. Similarly, the fixed contacts 68 are made integral with moulded inserts only one of which is shown at 99 which project respectively into the wiring channels 94, 94¹ having tapped ends to receive the terminal screws 70, 71 for the wiring.

The plate 65 is formed with two L-shaped extensions 100, 101 which cooperate respectively with the pins 90, 91 to form a guide for element 72.

The device above dscribed is attached to a projectile by screws passing through apertures 102, 103 in lugs 104, 105 moulded with the base plate 89.

Assuming the above described device is attached to a projectile it operates as follows:

Figure 5 shows the normal position of the parts, the inertia element 72 being held in the latched position shown under pressure of the spring 82. The pressure of the spring blades 55, 56 does not act on the element 72 but on the plate 65 which is fixed in position. If now the projectile, for example a rocket, to which the device is fitted is fired or discharged, acceleration will move the weight 72 back against the pressure exerted by the spring 82 thus releasing the latch 84 which will move under the action of its spring 85 into the position shown in Fig. 8 in which the recess 83 is to one side of the inertia element whilst the second deeper recess 86 is brought into line therewith. After reaching a maximum, the acceleration will begin to diminish and will fall to the same value as was effective in moving the inertia element against the spring 82, this value depending on the general design of the device and on the setting of the spring 82; when the acceleration drops to this value the inertia element will move forward with the pins 90, 91, and the latter will act on the central elements 63, 63 of the trident spring blade systems which snap the system over the dead centre position, as a result of which the contacts 66, 67 make with their respective fixed contacts 68, 68 to close the control circuit.

Devices made according to the invention are intended more particularly for fitting to projectiles such as rockets, shells and torpedoes or guided missiles.

Such projectiles and the like are usually fired or projected with considerable force involving a very high initial acceleration and this acceleration is the phenomenon which triggers or unlatches devices according to the present invention to arm or place devices of the invention in readiness for action.

In the case of guided missiles, rockets and the like these are frequently projected initially by means of rockets or boosters secured to the projectile or missile and as these burn out or complete their action the acceleration of the projectile or missile begins to fall off and at a pre-determined value, generally of the order of 1g or so, the devices of the present invention come into action to close electric circuits which may detach the booster rockets and set into action secondary rockets or the guided missiles normal driving motors.

If the device is fitted to a shell the backward movement of the inertia element as the result of acceleration may be used to operate the shell arming mechanism, the closing of the circuit resulting from the subsequent forward movement of the inertia element controlling the explosion of the shell.

In the case of torpedoes, the inertia element, locked under normal conditions, is released when the torpedo is fired, to arm the torpedo, and when the latter strikes its target it initiates the operation of the exploder mechanism.

When used during tests and trials, or if the torpedo misses the target, the resulting fall in acceleration, when the motor slows down, may be used to operate the inertia element to initiate the operation of position indicating means, or cause the torpedo to sink if recovery is not intended.

In the application of the device to aerial missiles or the like as above described, the device may be arranged to set mechanism into operation upon launching. When the acceleration falls to a predetermined value, other mechanism may be set into operation or a plurality of devices may be provided which operate at slightly different values of acceleration so that a sequence of operations may be effected.

The form of device shown in Figs. 1–4 provides what may be termed a differential or subtraction action device, or electric switch, and permits robust and reliable spring elements to be used with an exceptionally low operating value due to the differential action of the spring system.

The form of the device shown in Figs. 5–9 requires a shorter travel of the inertia element than the form shown in Figs. 1–4 and consequently can operate more rapidly.

Apart from the above described applications, it will be understood by those skilled in the art that the device has other applications within the scope of the invention and that the particular mechanism described is susceptible of modification within the scope of the appended claims.

What I claim and desire to secure by Letters Patent is:

1. An inertia operated switch comprising an inertia member mounted for free movement in one direction under the action of an acceleration exceeding a predetermined value, force exerting means for exerting a force on said inertia member tending to move it in the opposite direction into a position in which it is to become operative, means for holding said member in an inoperative position against the force exerted by said means until said member is first moved away from said operative position by an acceleration exceeding said predetermined value, and further force exerting means for producing a force less than, and in opposition to, that of said first-mentioned force exerting means, the resultant of the two forces exerted by the two force exerting means determining the fall in acceleration at which said inertia member moves into the operative position.

2. An inertia operated switch comprising an inertia member mounted for free movement in one direction under the action of an acceleration exceeding a predetermined value, spring means for exerting a force on said inertia member tending to move it in the opposite direction into a position in which it is to become operative, a latching member for holding said inertia member in inoperative position against the force exerted by said spring means until said inertia member is first moved away from said operative position by an acceleration exceeding said predetermined value, and additional spring means opposing the movement of said inertia member into the operative position until such time as the acceleration which effected the release of the inertia member from the hold of the latching member falls to a predetermined value.

3. An inertia operated switch comprising an inertia member mounted for free movement in one direction under the action of an acceleration exceeding a predetermined value, two unequal springs acting in opposite directions, respectively, on said inertia member, so as to produce a resultant spring force on said inertia member tending to move it in the opposite direction into a position in which it is to become operative, and latching means for holding said member in an inoperative position against said resultant spring force until said member is first moved away from said operative position by an acceleration exceeding said predetermined value.

4. An inertia operated switch comprising an inertia member mounted for free movement in one direction under the action of an acceleration exceeding a predetermined value, spring means for exerting a force on said inertia member tending to move it in the opposite direction into a position in which it is to become operative, means for varying the tension of the spring means to vary the force exerted thereby on said inertia member, and latching means for holding said member in an inoperative position against the force exerted by said spring means until said member is first moved away from said operative position by an acceleration exceeding said predetermined value.

5. An inertia operated switch according to claim 7 further comprising means for varying the loading of at least one of said unequal springs to vary the resultant force acting on said inertia member.

6. An inertia operated switch comprising an inertia member mounted for free movement in one direction under the action of an acceleration exceeding a predetermined value, coil spring means for exerting a force on said inertia member tending to move it in the opposite direction into a position in which it is to become operative, a spring-pressed latching member adapted to engage and hold the inertia member against movement into the operative position under the action of said coil spring means, a pivot pin on which said latching member is mounted intermediate its ends, a slidably mounted locking member adapted normally to engage one end of said latching member to hold it in the latching position against the action of its spring, in which position the other end of said latching member engages said inertia member, a coil spring acting on said locking member to press it into the locking position, said locking member being moved out of said locking position by said inertia member when the latter is actuated by acceleration, thus enabling the latching member to be moved by its spring into the unlatched position, means for varying the axial length of said coil spring exerting a force on said inertia member, to vary the pressure exerted by said spring, and means for varying the axial length of said coil spring acting on said locking member to vary the pressure exerted by said spring.

7. An inertia operated switch comprising an inertia member mounted for free movement in one direction under the action of an acceleration exceeding a predetermined value, two unequal springs, acting in opposite directions, respectively, on said inertia member, so as to produce a resultant spring force on said inertia member tending to move it in the opposite direction into a position in which it is to become operative, said two unequal springs comprising a first spring acting on said inertia member to oppose movement thereof into the operative position, and a second spring exerting a larger force on said inertia element in opposition to the force exerted by said first spring and tending to move said inertia member into said operative position, and means for holding said member in an inoperative position against said resultant spring force until said member is first moved away from said operative position by an acceleration exceeding said predetermined value, said holding means comprising a latching member adapted to be released on the occurrence of said acceleration exceeding said predetermined value.

8. An inertia operated switch according to claim 2 wherein said additional spring means consists of at least one three-pronged leaf spring arranged to oppose the movement of said inertia member into the operative position until such time as the acceleration effecting the release of the latch falls to a predetermined critical value.

9. An inertia operated switch according to claim 2 wherein said additional spring means consists of at least one three-pronged leaf spring arranged to oppose the movement of said inertia member into the operative position until such time as the acceleration effecting the release of the latch falls to a predetermined critical value and further comprising at least one external circuit having a gap, a fixed contact at each end of said gap, said three-pronged leaf spring being adapted when said inertia element moves into the operative position to bridge said gap and close said circuit.

10. An inertia operated switch comprising an inertia member mounted for free movement under the action of an acceleration exceeding a predetermined value in a direction away from an operative position in which it effects a desired operation, spring means for exerting a force on said inertia member tending to move it in the opposite direction, i. e. into the operative position, a spring-pressed latching member adapted to engage and hold the inertia member against movement into the operative position under the action of said spring means, a pivot pin on which said latching member is mounted intermediate its ends, and a slidably mounted locking member adapted normally to engage one end of said latching member to hold it in the latching position against the action of its spring, in which position the other end of said latching member engages said inertia member, said locking member being moved out of locking position when said inertia member moves away from said operative position under the action of an acceleration exceeding said predetermined value thus enabling the latching member to be moved by its spring into the unlatched position.

11. An inertia operated switch comprising an inertia member mounted for free movement under the action of an acceleration exceeding a predetermined value in a direction away from an operative position in which it effects a desired operation, spring means for exerting a force on said inertia member tending to move it in the opposite direction, i. e. into the operative position, latching member adapted to engage and hold the inertia member against movement into the operative position under the action of said spring means, and a slidably mounted locking member adapted normally to engage one end of said latching member to hold it in the latching position, in which position the other end of said latching member engages said inertia member, said locking member being moved out of locking position when said inertia member moves away from said operative position under the action of an acceleration exceeding said predetermined value thus enabling the latching member to be moved by its spring into the unlatched position.

References Cited in the file of this patent

UNITED STATES PATENTS

| 915,246 | Stratton | Mar. 16, 1909 |
| 1,099,093 | Kent | June 2, 1914 |
| 2,202,043 | Cole | May 28, 1940 |
| 2,254,294 | Kimmell | Sept. 2, 1941 |
| 2,317,028 | Chappell | Apr. 20, 1943 |
| 2,406,427 | Leonard | Aug. 27, 1946 |
| 2,420,028 | Bleakney | May 6, 1947 |
| 2,424,390 | Ferris | July 22, 1947 |
| 2,553,708 | Harmon | May 22, 1951 |
| 2,671,832 | Hansard et al. | Mar. 9, 1954 |

FOREIGN PATENTS

| 559,923 | Great Britain | Mar. 10, 1944 |